United States Patent
Yee et al.

(10) Patent No.: US 6,710,988 B1
(45) Date of Patent: Mar. 23, 2004

(54) SMALL-SIZED INDUSTRIAL RATED ELECTRIC MOTOR STARTER SWITCH UNIT

(75) Inventors: Edgar Yee, Chapel Hill, NC (US); Robert A. Morris, Burlington, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/375,694

(22) Filed: Aug. 17, 1999

(51) Int. Cl.[7] .................................................. H02H 5/00
(52) U.S. Cl. ............................ 361/23; 361/31; 361/104
(58) Field of Search ........................ 361/23–25, 28–31, 361/103–104, 110

(56) References Cited

U.S. PATENT DOCUMENTS

| | | | |
|---|---|---|---|
| 2,340,682 A | 2/1944 | Powell ........................ 200/147 |
| 2,719,203 A | 9/1955 | Gelzheiser et al. ......... 200/144 |
| 2,937,254 A | 5/1960 | Ericson ...................... 200/114 |
| 3,158,717 A | 11/1964 | Jencks et al. ............... 200/116 |
| 3,162,739 A | 12/1964 | Klein et al. .................... 200/88 |
| 3,197,582 A | 7/1965 | Norden ........................ 200/50 |
| 3,307,002 A | 2/1967 | Cooper ....................... 200/116 |
| 3,517,356 A | 6/1970 | Hanafusa ..................... 335/16 |
| 3,631,369 A | 12/1971 | Menocal ..................... 337/110 |
| 3,638,157 A * | 1/1972 | Kruzic ........................... 337/6 |
| 3,803,455 A | 4/1974 | Willard .................. 317/33 SC |
| 3,883,781 A | 5/1975 | Cotton ...................... 317/14 R |
| 4,000,446 A * | 12/1976 | Vandevier et al. ............. 361/31 |
| 4,129,762 A | 12/1978 | Bruchet .................. 200/153 G |
| 4,144,513 A | 3/1979 | Shafer et al. ................. 335/46 |
| 4,149,216 A | 4/1979 | Kussy et al. ................ 361/357 |
| 4,158,119 A | 6/1979 | Krakik ........................ 200/240 |
| 4,165,453 A | 8/1979 | Hennemann ............ 200/153 G |
| 4,166,988 A | 9/1979 | Ciarcia et al. .................. 335/9 |
| 4,220,934 A | 9/1980 | Wafer et al. .................. 335/16 |
| 4,255,732 A | 3/1981 | Wafer et al. .................. 335/16 |
| 4,259,651 A | 3/1981 | Yamat ......................... 335/16 |
| 4,263,492 A | 4/1981 | Maier et al. ................. 200/288 |
| 4,276,527 A | 6/1981 | Gerbert-Gaillard et al. ... 335/39 |
| 4,297,663 A | 10/1981 | Seymour et al. .............. 335/20 |
| 4,301,342 A | 11/1981 | Castonguay et al. .. 200/153 SC |
| 4,360,852 A | 11/1982 | Gilmore ....................... 361/98 |
| 4,368,444 A | 1/1983 | Preuss et al. ............... 335/166 |
| 4,375,021 A | 2/1983 | Pardini et al. ........... 200/147 B |
| 4,375,022 A | 2/1983 | Daussin et al. ......... 200/148 R |
| 4,376,270 A | 3/1983 | Staffen ........................ 335/21 |
| 4,383,146 A | 5/1983 | Bur .......................... 200/17 R |
| 4,392,036 A | 7/1983 | Troebel et al. .............. 200/322 |
| 4,393,283 A | 7/1983 | Masuda ................... 200/51.09 |
| 4,401,872 A | 8/1983 | Boichot-Castagne et al. ...................... 200/153 G |

(List continued on next page.)

FOREIGN PATENT DOCUMENTS

| | | |
|---|---|---|
| BE | 819 008 A | 12/1974 |
| BE | 897 691 A | 4/1984 |
| DE | 12 27 978 | 11/1966 |
| DE | 30 47 360 | 6/1982 |
| DE | 38 02 184 | 8/1989 |
| DE | 38 43 277 | 6/1990 |
| DE | 44 19 240 | 1/1995 |
| DE | 1 227 978 | 11/1996 |

(List continued on next page.)

Primary Examiner—Stephen W. Jackson
(74) Attorney, Agent, or Firm—Cantor Colburn LLP

(57) ABSTRACT

A molded case electric switch housing includes an electric switch control circuit for motor overload and phase loss conditions, a motor contactor control circuit for turning an associated electric motor ON and OFF and a replaceable fuse unit for handling short-circuit type faults. Upon the occurrence of a short circuit within the protected circuit, the fuse rapidly interrupts the short circuit to protect the electric circuit. The fuse is replaced before power is restored to the protected circuit. The arrangement of the electric switch control circuit, motor contactor control circuit and fuse allows single sized switch current-carrying components to be used over a wide range of motor ratings.

20 Claims, 2 Drawing Sheets

U.S. PATENT DOCUMENTS

| | | | |
|---|---|---|---|
| 4,409,573 A | 10/1983 | Di Marco et al. ............ 335/16 |
| 4,435,690 A | 3/1984 | Link et al. .................... 335/37 |
| 4,467,297 A | 8/1984 | Boichot-Castagne et al. .. 335/8 |
| 4,468,645 A | 8/1984 | Gerbert-Gaillard et al. ... 335/42 |
| 4,470,027 A | 9/1984 | Link et al. .................... 335/16 |
| 4,479,143 A | 10/1984 | Watanabe et al. ............. 358/44 |
| 4,488,133 A | 12/1984 | McClellan et al. ........... 335/16 |
| 4,492,941 A | 1/1985 | Nagel .......................... 335/13 |
| 4,541,032 A | 9/1985 | Schwab ....................... 361/331 |
| 4,546,224 A | 10/1985 | Mostosi ................. 200/153 G |
| 4,550,360 A | 10/1985 | Dougherty ................... 361/93 |
| 4,562,419 A | 12/1985 | Preuss et al. ................ 335/195 |
| 4,589,052 A | 5/1986 | Dougherty ................... 361/94 |
| 4,595,812 A | 6/1986 | Tamaru et al. .............. 200/307 |
| 4,611,187 A | 9/1986 | Banfi ........................ 335/16 |
| 4,612,430 A | 9/1986 | Sloan et al. ................. 200/327 |
| 4,616,198 A | 10/1986 | Pardini ........................ 335/16 |
| 4,622,444 A | 11/1986 | Kandatsu et al. ........... 200/303 |
| 4,631,625 A | 12/1986 | Alexander et al. ............ 361/94 |
| 4,642,431 A | 2/1987 | Tedesco et al. ......... 200/153 G |
| 4,644,438 A | 2/1987 | Puccinelli et al. ............ 361/75 |
| 4,649,247 A | 3/1987 | Preuss et al. ............... 200/244 |
| 4,658,322 A | 4/1987 | Rivera ........................ 361/37 |
| 4,672,501 A | 6/1987 | Bilac et al. .................... 361/96 |
| 4,675,481 A | 6/1987 | Markowski et al. .... 200/144 R |
| 4,682,264 A | 7/1987 | Demeyer ..................... 361/96 |
| 4,689,712 A | 8/1987 | Demeyer ..................... 361/96 |
| 4,694,373 A | 9/1987 | Demeyer ..................... 361/96 |
| 4,710,845 A | 12/1987 | Demeyer ..................... 361/96 |
| 4,717,985 A | 1/1988 | Demeyer ..................... 361/96 |
| 4,733,211 A | 3/1988 | Castonguay et al. ........ 335/192 |
| 4,733,321 A | 3/1988 | Lindeperg ..................... 361/96 |
| 4,754,247 A | 6/1988 | Raymont et al. ........... 335/202 |
| 4,764,650 A | 8/1988 | Bur et al. ................. 200/153 G |
| 4,768,007 A | 8/1988 | Mertz et al. ................ 335/202 |
| 4,780,786 A | 10/1988 | Weynachter et al. .......... 361/87 |
| 4,831,221 A | 5/1989 | Yu et al. ..................... 200/553 |
| 4,870,531 A | 9/1989 | Danek ........................ 361/93 |
| 4,883,931 A | 11/1989 | Batteux et al. ......... 200/148 R |
| 4,884,047 A | 11/1989 | Baginski et al. ............... 335/10 |
| 4,884,164 A | 11/1989 | Dziura et al. ................. 361/97 |
| 4,900,882 A | 2/1990 | Bernard et al. ......... 200/147 R |
| 4,910,485 A | 3/1990 | Bolongeat-Mobleu et al. .......... 335/195 |
| 4,914,541 A | 4/1990 | Tripodi et al. ................. 361/94 |
| 4,916,420 A | 4/1990 | Bartolo et al. .............. 335/172 |
| 4,916,421 A | 4/1990 | Pardini et al. .............. 335/185 |
| 4,926,282 A | 5/1990 | McGhie ..................... 361/102 |
| 4,935,590 A | 6/1990 | Malkin et al. ......... 200/148 A |
| 4,937,706 A | 6/1990 | Schueller et al. ........... 361/396 |
| 4,939,492 A | 7/1990 | Raso et al. .................... 335/42 |
| 4,943,691 A | 7/1990 | Mertz et al. ................ 200/151 |
| 4,943,888 A | 7/1990 | Jacob et al. .................... 361/96 |
| 4,950,855 A | 8/1990 | Bolonegeat-Mobleu et al. ...................... 200/148 A |
| 4,951,019 A | 8/1990 | Gula .......................... 335/166 |
| 4,952,897 A | 8/1990 | Barnel et al. ............... 335/147 |
| 4,958,135 A | 9/1990 | Baginski et al. ............... 335/8 |
| 4,965,543 A | 10/1990 | Batteux ....................... 335/174 |
| 4,979,069 A * | 12/1990 | Simpson ..................... 361/31 |
| 4,983,788 A | 1/1991 | Pardini ..................... 200/16 R |
| 5,001,313 A | 3/1991 | Leclerq et al. .......... 200/148 B |
| 5,004,878 A | 4/1991 | Seymour et al. ........ 200/144 R |
| 5,029,301 A | 7/1991 | Nebon et al. .................. 335/16 |
| 5,030,804 A | 7/1991 | Abri ........................ 200/323 |
| 5,057,655 A | 10/1991 | Kersusan et al. ....... 200/148 B |
| 5,077,627 A | 12/1991 | Fraisse ........................ 361/93 |
| 5,083,081 A | 1/1992 | Barrault et al. ............. 324/126 |
| 5,095,183 A | 3/1992 | Raphard et al. ........ 200/148 A |
| 5,103,198 A | 4/1992 | Morel et al. ................... 335/6 |
| 5,115,371 A | 5/1992 | Tripodi ....................... 361/106 |
| 5,120,921 A | 6/1992 | DiMarco et al. ............. 200/401 |
| 5,132,865 A | 7/1992 | Mertz et al. .................... 361/6 |
| 5,138,121 A | 8/1992 | Streich et al. ............... 200/293 |
| 5,140,115 A | 8/1992 | Morris ....................... 200/308 |
| 5,153,802 A | 10/1992 | Mertz et al. .................... 361/18 |
| 5,155,315 A | 10/1992 | Malkin et al. .......... 200/148 R |
| 5,166,483 A | 11/1992 | Kersusan et al. ....... 200/144 A |
| 5,172,087 A | 12/1992 | Castonguay et al. ........ 335/160 |
| 5,178,504 A | 1/1993 | Falchi ........................ 411/553 |
| 5,184,717 A | 2/1993 | Chou et al. ................. 200/401 |
| 5,187,339 A | 2/1993 | Lissandrin ............. 200/148 F |
| 5,189,388 A * | 2/1993 | Mosley et al. ......... 340/309.15 |
| 5,198,956 A | 3/1993 | Dvorak ....................... 361/106 |
| 5,200,724 A | 4/1993 | Gula et al. .................. 335/166 |
| 5,210,385 A | 5/1993 | Morel et al. ............ 200/146 R |
| 5,239,150 A | 8/1993 | Bolongeat-Mobleu et al. ...................... 200/148 R |
| 5,243,243 A * | 9/1993 | Andrews ..................... 310/72 |
| 5,260,533 A | 11/1993 | Livesey et al. ............. 200/401 |
| 5,262,744 A | 11/1993 | Arnold et al. ................. 335/8 |
| 5,280,144 A | 1/1994 | Bolongeat-Mobleu et al. ...................... 200/148 R |
| 5,281,776 A | 1/1994 | Morel et al. ................. 200/144 |
| 5,296,660 A | 3/1994 | Morel et al. ............ 200/146 R |
| 5,296,664 A | 3/1994 | Crookston et al. .......... 200/401 |
| 5,298,874 A | 3/1994 | Morel et al. .................... 335/8 |
| 5,300,907 A | 4/1994 | Nereau et al. ............... 335/172 |
| 5,310,971 A | 5/1994 | Vial et al. ................... 200/244 |
| 5,313,180 A | 5/1994 | Vial et al. .................... 335/16 |
| 5,317,471 A | 5/1994 | Izoard et al. ............... 361/105 |
| 5,331,500 A | 7/1994 | Corcoles et al. .............. 361/93 |
| 5,334,808 A | 8/1994 | Bur et al. ...................... 200/50 |
| 5,341,191 A | 8/1994 | Crookston et al. ............ 335/16 |
| 5,347,096 A | 9/1994 | Bolongeat-Mobleu et al. ...................... 200/148 B |
| 5,347,097 A | 9/1994 | Bolongeat-Mobleu et al. ...................... 200/148 B |
| 5,350,892 A | 9/1994 | Rozier .................... 200/144 B |
| 5,357,066 A | 10/1994 | Morel et al. .............. 200/17 R |
| 5,357,068 A | 10/1994 | Rozier .................... 200/148 R |
| 5,357,394 A | 10/1994 | Piney ........................ 361/72 |
| 5,361,052 A | 11/1994 | Ferullo et al. .............. 335/172 |
| 5,373,130 A | 12/1994 | Barrault et al. ......... 200/147 R |
| 5,379,013 A | 1/1995 | Coudert ....................... 335/17 |
| 5,424,701 A | 6/1995 | Castonguary et al. ........ 335/172 |
| 5,426,406 A | 6/1995 | Morris et al. ............... 335/202 |
| 5,438,176 A | 8/1995 | Bonnardel et al. .......... 200/400 |
| 5,440,088 A | 8/1995 | Coudert et al. ............. 200/303 |
| 5,449,871 A | 9/1995 | Batteux et al. .............. 200/401 |
| 5,450,048 A | 9/1995 | Leger et al. ................ 335/132 |
| 5,451,729 A | 9/1995 | Onderka et al. ............... 200/18 |
| 5,457,295 A | 10/1995 | Tanibe et al. ............... 200/293 |
| 5,467,069 A | 11/1995 | Payet-Burin et al. ......... 335/42 |
| 5,469,121 A | 11/1995 | Payet-Burin ................ 335/16 |
| 5,475,558 A | 12/1995 | Barjonnet et al. ............ 361/64 |
| 5,477,016 A | 12/1995 | Baginski et al. ......... 200/43.11 |
| 5,479,143 A | 12/1995 | Payet-Burin ................ 335/202 |
| 5,483,212 A | 1/1996 | Lankuttis et al. ............ 335/132 |
| 5,485,343 A | 1/1996 | Santos et al. ............... 361/115 |
| D367,265 S | 2/1996 | Yamagata et al. .......... D13/160 |
| 5,493,083 A | 2/1996 | Olivier .................... 200/17 R |
| 5,504,284 A | 4/1996 | Lazareth et al. .......... 200/50 R |
| 5,504,290 A | 4/1996 | Baginski et al. ............. 200/401 |
| 5,510,761 A | 4/1996 | Boder et al. ................ 335/172 |
| 5,512,720 A | 4/1996 | Coudert et al. ............. 200/400 |
| 5,515,018 A | 5/1996 | DiMarco et al. ............... 335/16 |
| 5,519,561 A | 5/1996 | Mrenna et al. ............. 361/105 |
| 5,534,674 A | 7/1996 | Steffens ....................... 218/154 |
| 5,534,832 A | 7/1996 | Duchemin et al. ............ 335/16 |
| 5,534,835 A | 7/1996 | McColloch et al. ......... 335/172 |

| | | | | | | |
|---|---|---|---|---|---|---|
| 5,534,840 A | | 7/1996 | Cuingnet ........................ 337/1 | EP | 0 309 923 | 4/1989 |
| 5,539,168 A | | 7/1996 | Linzenich .................... 200/303 | EP | 0 313 106 | 4/1989 |
| 5,539,370 A | | 7/1996 | Arnold ........................... 337/8 | EP | 0 313 422 | 4/1989 |
| 5,543,595 A | | 8/1996 | Mader et al. ................ 200/401 | EP | 0 314 540 | 5/1989 |
| 5,552,755 A | | 9/1996 | Fello et al. .................... 335/18 | EP | 0 331 586 | 9/1989 |
| 5,568,033 A | * | 10/1996 | Brunson ..................... 318/778 | EP | 0 337 900 | 10/1989 |
| 5,581,219 A | | 12/1996 | Nozawa et al. ............. 335/132 | EP | 0 342 133 | 11/1989 |
| 5,604,656 A | | 2/1997 | Derrick et al. .............. 361/187 | EP | 0 367 690 | 5/1990 |
| 5,608,367 A | | 3/1997 | Zoller et al. ................ 335/132 | EP | 0 371 887 | 6/1990 |
| 5,617,281 A | * | 4/1997 | Bauer et al. .................. 361/27 | EP | 0 375 568 | 6/1990 |
| 5,657,193 A | | 8/1997 | Purkayastha .................. 361/23 | EP | 0 394 144 | 10/1990 |
| 5,784,233 A | | 7/1998 | Bastard et al. ................ 361/36 | EP | 0 394 922 | 10/1990 |
| 5,808,846 A | * | 9/1998 | Holce et al. ................... 361/93 | EP | 0 399 282 | 11/1990 |
| 5,814,955 A | * | 9/1998 | Bauer et al. ................ 318/376 | EP | 0 407 310 | 1/1991 |
| 5,822,164 A | | 10/1998 | Graf ............................. 361/23 | EP | 0 452 230 | 10/1991 |
| | | | | EP | 0 555 158 | 8/1993 |

FOREIGN PATENT DOCUMENTS

| | | |
|---|---|---|
| EP | 0 061 092 | 9/1982 |
| EP | 0 064 906 | 11/1982 |
| EP | 0 066 486 | 12/1982 |
| EP | 0 076 719 | 4/1983 |
| EP | 0 117 094 | 8/1984 |
| EP | 0 140 761 | 5/1985 |
| EP | 0 174 904 | 3/1986 |
| EP | 0 196 241 | 10/1986 |
| EP | 0 224 396 | 6/1987 |
| EP | 0 235 479 | 9/1987 |
| EP | 0 239 460 | 9/1987 |
| EP | 0 258 090 | 3/1988 |
| EP | 0 264 313 | 4/1988 |
| EP | 0 264 314 | 4/1988 |
| EP | 0 283 189 | 9/1988 |
| EP | 0 283 358 | 9/1988 |
| EP | 0 291 374 | 11/1988 |
| EP | 0 295 155 | 12/1988 |
| EP | 0 295 158 | 12/1988 |
| EP | 0 560 697 | 9/1993 |
| EP | 0 567 416 | 10/1993 |
| EP | 0 595 730 | 5/1994 |
| EP | 0 619 591 | 10/1994 |
| EP | 0 665 569 | 8/1995 |
| EP | 0 700 140 | 3/1996 |
| EP | 0 889 498 | 1/1999 |
| FR | 2 410 353 | 6/1979 |
| FR | 2 512 582 | 3/1983 |
| FR | 2 553 943 | 4/1985 |
| FR | 2 592 998 | 7/1987 |
| FR | 2 682 531 | 4/1993 |
| FR | 2 697 670 | 5/1994 |
| FR | 2 699 324 | 6/1994 |
| FR | 2 714 771 | 7/1995 |
| GB | 2 233 155 | 1/1991 |
| WO | 92/00598 | 1/1992 |
| WO | 92/05649 | 4/1992 |
| WO | 94/00901 | 1/1994 |

\* cited by examiner

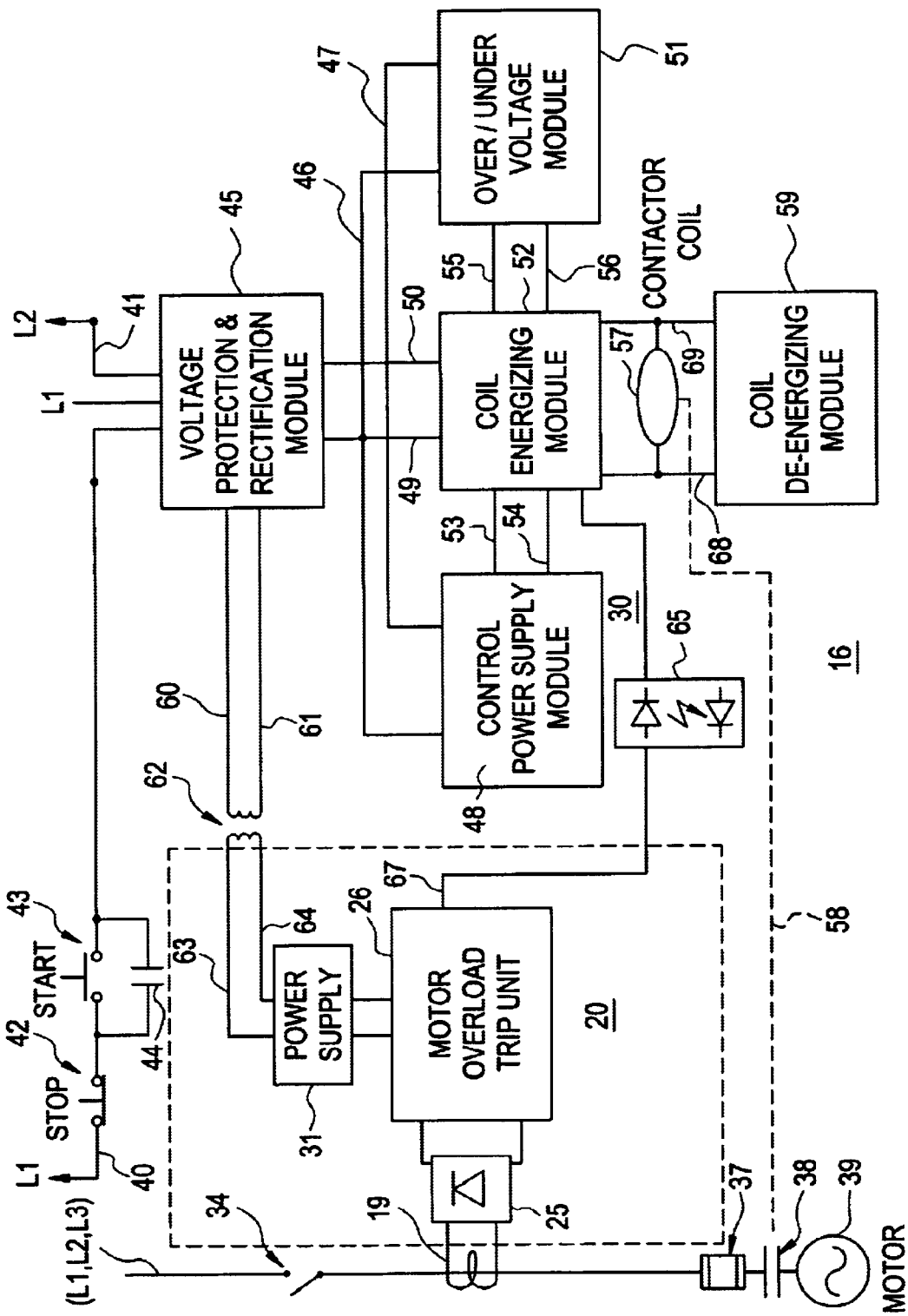

SMALL-SIZED INDUSTRIAL RATED ELECTRIC MOTOR STARTER SWITCH UNIT

CROSS REFERENCE TO RELATED APPLICATION

This is related to U.S. patent application Ser. No. 09/375,872 entitled Breaker/Starter with Auto-Configurable Trip Unit filed concurrently herewith which is incorporated herein by reference.

BACKGROUND OF THE INVENTION

In the field of motor control, a conventional motor starter typically consists of a contactor and a motor overload relay. The contactor is typically a three-pole switch, which is usually operated by a continuously energized solenoid coil. Since the contactor controls the operation of the motor, i.e., the starting and stopping, it must be rated for many thousands of operations.

The overload relay, on the other hand, provides overload protection to the motor from overload conditions. Overload conditions occur when equipment is operated in an electrically undamaged circuit in excess of normal full-load rating, or when conductors carry current in excess of rated ampacity. Overload conditions persisting for a sufficient length of time will damage or overheat the equipment. Overload conditions do not include faults, which require instantaneous protection such as a short circuit or ground fault or a loss of a phase. The terms "overload," "overload protection" and "overload relay" are defined in the National Electrical Manufacturers Association (NEMA) standard ICS2, which is herein incorporated by reference.

To protect a motor from faults, which require instantaneous protection, circuit breakers, e.g. instantaneous trip circuit breakers, are typically used. Additionally these circuit breakers function as a manual disconnect switch (disconnect) which serve to isolate the motor during a maintenance operation.

Devices which combine the instantaneous protection of a circuit breaker as well as the motor starter functions in a single enclosure are known as combination starters. However, the current-carrying components of instantaneous trip circuit breakers are constructed of heavy copper bars and large-sized tungsten contacts to protect against thermal damage upon short circuit interruption. This is especially so when the circuit breakers are used in circuits containing electric induction motors. The large size of the components increases the size of the circuit breaker to the extent that such circuit breakers do not fit within certain standard Asian and European circuit breaker enclosures. Therefore prior art combination starters utilizing instantaneous trip circuit breakers are bulky and expensive.

U.S. Pat. No. 4,754,247 entitled "Molded Case Electric Switch Accessory Enclosure" describes an arrangement whereby electric switch accessories can be inserted within the electric switch enclosure for electrical connection with the electric switch control circuit. U.S. Pat. No. 4,884,164 entitled "Molded Case Electronic Circuit Interrupter" describes an industrial-rated circuit breaker having an electronic trip unit that is adjustable over a wide range of long and short time over-current conditions. U.S. Pat. No. 4,149,216 entitled "Fused Unitized Combination Starter" describes the early use of a switch, contactor and fuse unit with the fuse unit connected in series between the switch and contactor. U.S. Pat. No. 5,822,164 entitled "Pre-Engineered Combination Starter for Multiple Motor Sizes" describes the use of an electronic overload relay, a contactor and a fuse for motor protection.

The use of a positive temperature coefficient device in series with an electronic circuit breaker to provide improved circuit protection to circuits including electric inductive motors to prevent the circuit breaker trip unit from responding to over-current motor start-up current is described within a more recent U.S. Pat. No. 5,539,370 entitled "Inductive Motor Protective Circuit Breaker."

It has since been determined that adequate short circuit protection can be provided to low ampere-rated electric switches having smaller-sized moveable contact arms and contacts by the use of an electronic trip circuit for motor overload and phase loss conditions in induction motor protective circuits, a fuse for short circuit interruption, and a motor contactor unit for turning the motor ON and OFF. A deterrent to the use of replaceable fuses with electronic circuit protective devices is the inconvenience of locating the fuse and replacing the fuse before re-closing the electric switch contacts.

A further deterrent to the use of a motor contactor unit in combination with electronic trip units is the requirement of supplemental power for operation of the electronic trip units when the switch contacts are opened. This is because electronic trip units compensate for thermal memory effects through software algorithms. Thermal memory, i.e., operating memory, is defined in NEMA standard ICS2 as the cumulative heating effect in a motor circuit resulting from motor operation or overload, and the cooling effect after the motor circuit is deenergized. However, the ability to compensate for thermal memory is lost in prior art electronic trip units when power is interrupted.

A recent attempt to use the electronic trip unit in a "smart" circuit breaker incorporating an application specific integrated circuit (ASIC) microprocessor in combination with a motor contactor unit is found in U.S. Pat. No. 5,657,193 entitled "Electronic Control Module for Motor Controller Units" wherein a smart circuit breaker trip unit is interconnected with a contactor unit to employ the current sensing and circuit interrupting function of the circuit breaker in a motor protection circuit.

SUMMARY OF THE INVENTION

Thus there is a particular need for a molded case combination starter having an electronic trip unit for motor overload conditions, a fuse for short circuit interruption and a manual disconnect switch.

The molded case combination starter housing has an enclosure which includes a motor contactor control circuit within one enclosure for long motor overload, and a replaceable fuse unit within a separate enclosure for handling short-circuit type faults. Upon the occurrence of a short circuit within the protected circuit, the fuse rapidly responds to interrupt the short circuit. The fuse is conveniently replaced before power is restored to the protected circuit.

In an exemplary embodiment of the invention, a manual disconnect switch is provided. The disconnect isolates the motor during a maintenance operation, e.g., changing of the fuse.

BRIEF DESCRIPTION OF THE DRAWINGS

FIG. 2 is a diagrammatic representation of the electric switch control circuit, motor contactor control circuit and replaceable fuse used within the combination switch of FIG. 1.

DESCRIPTION OF THE PREFERRED EMBODIMENT

Figure 1:
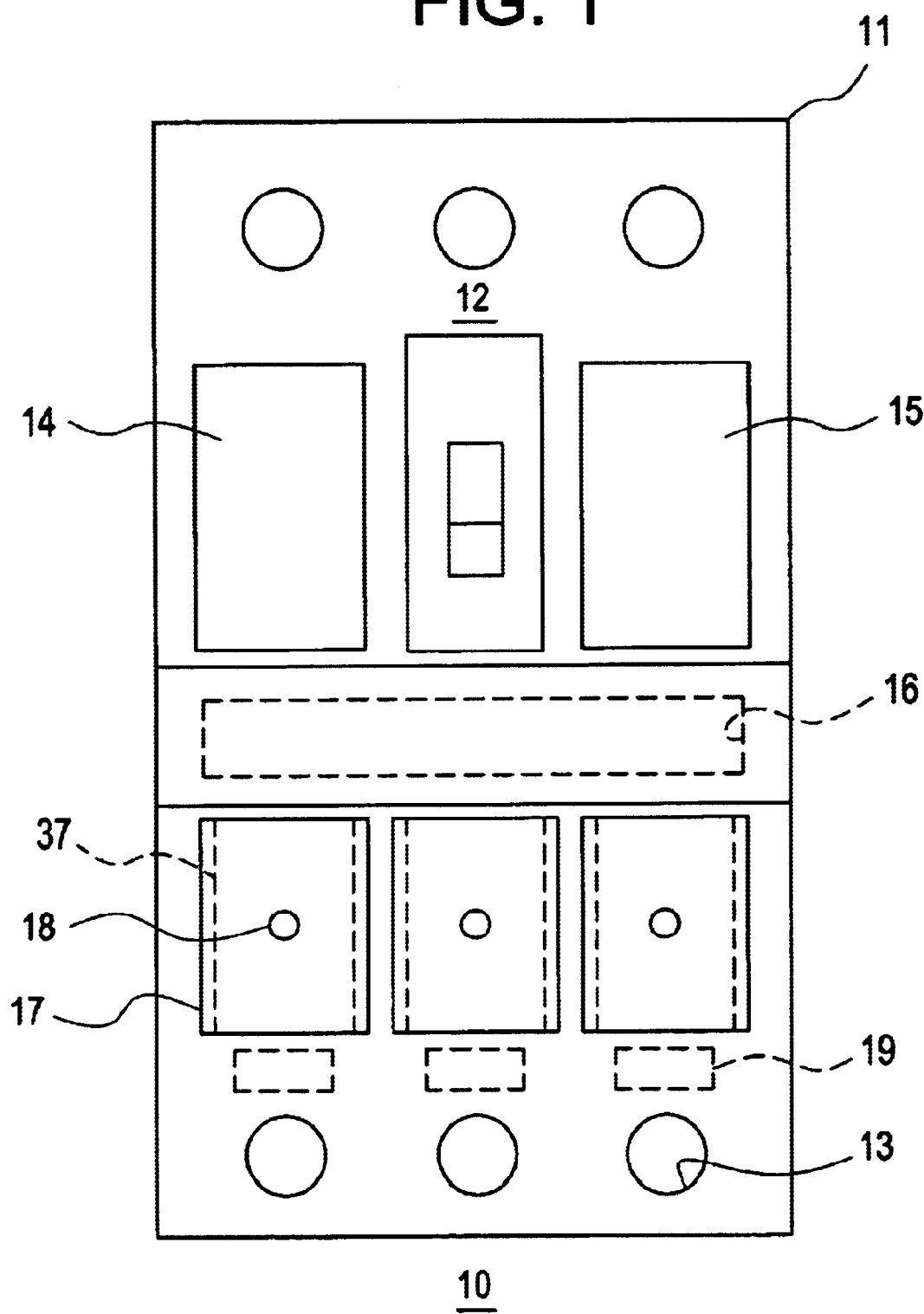
FIG. 1 is top perspective view of a molded case combination starter having the electric switch control circuit, motor contactor control circuit and replaceable fuse in accordance with the invention.

The combination starter 10, according to the invention, is shown in FIG. 1 to consist of a molded plastic case 11 that includes a removable cover 12 for accessing the internal components whereby electric connection is made by means of the circular apertures 13. The case is similar to that described within U.S. Pat. No. 4,754,247 entitled "Molded Case Circuit Breaker Accessory Enclosure" (which is incorporated by reference) which includes externally accessible accessory compartments 14, 15 for housing bell alarm accessories and the like. Also contained within the case 11 is the combined electronic trip unit and contactor switch circuit 16. In further accordance with the invention, three fuse compartments 17 which include replaceable fuses 37 such as Bussman or Gould type cartridge fuses that are capable of withstanding inrush motor starting currents and respond to actual short circuit occurrence during motor operation. Visual fuse indication status is obtained by means of the windows 18 formed in the covers of the fuse compartments 17. The current transformers 19 for sensing circuit current are enclosed within the load side of the case 11.

The combined electronic trip unit and contactor switch circuit 16 is shown in FIG. 2 connected with three-phase conductors L1 and L2. Disconnect switch contact 34 is in series connection with induction motor 39 through fuse 37 and contactor contact 38 respectively. It should be appreciated that the portion of FIG. 2 comprising the circuit connections to motor 39 through switch contact 34, transformer 19, fuse 37 and contactor contact 38 is a single line diagram of a three phase circuit shown for purposes of clarity.

The current transformer 19 and manual disconnect switch contact 34 connect with conductor L1. The current transformer 19 connects with the control ASIC 26 via the rectifier 25 in switch control circuit 20 for determining motor overload and phase loss conditions in the manner described within U.S. Pat. No. 4,589,052 entitled "Digital I²T Pickup, Time Bands and Timing Control Circuit for Static Trip Circuit Breakers" (which is incorporated by reference). Upon occurrence of motor overload and phase loss conditions, a trip signal is outputted over conductor 67 and opto-isolator 65 to the coil energizing module 52 in the contactor control circuit 30 to separate the contacts 38 via the contactor coil 57 and control line 58 to interrupt circuit current conductor L1. Operating power is provided to the power supply 31 by means of the current transformer 19. In accordance with the invention, supplemental operating power is provided to the power supply 31 via conductors 63, 64 and isolation transformer 62 which connects with the voltage protection and rectification module 45 over conductors 60, 61 as indicated. The voltage protection and rectification module 45 is similar to that contained within the CK Series Motor Contactor/Controller Unit of General Electric Company. Operating power to the contactor control circuit 30 is provided by means of multi-conductor cable 40 which connections within the three phase conductor L1 and conductor 41 which connects with the conductor L2. The electric induction motor 39 connects with three phase conductor L1 and conductor L2 by means of the contacts 38 via control line 58, described earlier, which connects with the contactor coil 57 and coil de-energizing module 59 for automatic separation of the contactor contacts 38. The voltage protection and rectification module 45 further connects with the over/under voltage module 51, control power module 48, and coil energizing module 52 via conductors 46, 47, 49, 50 and 53–56, as indicated. Connection between the coil energizing module 52 and the coil de-energizing module 59 and contactor coil 57, described earlier is made by means of conductors 68, 69. Connection between the coil energizing module 52 and the control ASIC 26 is made via conductor 67 and the optical isolator 65 for separation and closure of the contacts 38. The replaceable fuses 37 within the fuse compartments 17, shown earlier in FIG. 1, are selected to allow sufficient in-rush current to the motor 39 without interruption while interrupting upon occurrence of an overcurrent condition upon steady state motor operation in the manner described within U.S. Pat. No. 5,426,406 entitled "Induction Motor Protection Circuit Breaker Unit" (which is incorporated herein by reference). Manual motor STOP and START function is provided by means of the switches 42 and 43 respectively. An interlock contact 44 is arranged across the START switch 43. It should be noted that conductor L1 is connected directly to the voltage protection and rectification module 45, such that the module 45 receives a voltage supply after the stop switch 42 is operated to deenergize interlock contact 44. This assures that operating power will be supplied to switch control circuit 20 and contactor control circuit 30 at all times. This additionally assures that thermal memory will be compensated for in trip unit 26 at all times. It is noted that the components within the switch control circuit 20 and contactor control circuit 30 interconnect by means of the isolation transformer 62 and opto-isolator 65 to insure that the circuit current within the protected circuit does not transport therebetween to by-pass the contacts 38.

Advantageously, the use of fuse 37 and disconnect 34 (as opposed to the use of a circuit breaker) in the combination starter 10 reduces the cost of starter 10 relative to prior art combination starters. Additionally, the disconnect 34 does not require the large current carrying components rated for short circuit interruption. Therefore the overall size of starter 10 is reduced relative to prior art combination starters.

A combined electric starter has herein been described in combination with an electric fuse to allow current-carrying contacts to be used over a wide range of motor current ratings.

What is claimed is:

1. A combination starter for protecting a motor from overload current and short circuit conditions in an electrical system, the combination starter comprising:

a case;

a combined electronic trip unit and contactor switch circuit within said case, said combined electronic trip unit and contactor switch circuit includes:

a current transformer, an electronic trip unit electrically coupled to said current transformer, a coil energizing module optically coupled to said electronic trip unit, a contactor coil electrically coupled to said coil energizing module, a contactor mechanically coupled to said contactor coil, and wherein, said electronic trip unit is configured to provide a trip signal to said coil energizing module in response to an overload current condition in said electrical system; and a fuse within said case, said fuse electrically coupled to said contractor and configured for withstanding motor inrush current during motor start-up while interrupting said electrical system when said motor is operational and a short circuit current occurs within said electrical system.

2. The combination starter of claim 1 further including a motor stop switch and a motor start switch electrically coupled to said coil energizing module for turning said motor ON and OFF.

3. The combination starter of claim 2 wherein said motor stop switch is normally closed and said motor start switch is normally open.

4. The combination starter of claim 1 including an overvoltage/undervoltage protection circuit electrically coupled to said coil energizing module.

5. The combination starter of claim 1 wherein said coil energizing module is selected from a group including: an oscillator, a current level comparator, and engergizing signal generator, and a single shot generator.

6. The combination starter of claim 1, further including:
- a voltage protection and rectification module electrically coupled to said protected circuit;
- a power supply circuit electrically coupled to said electronic trip unit; and
- wherein said voltage protection and rectification module and said power supply circuit are interconnected by means of an isolation transformer.

7. The combination starter of claim 1 wherein said electronic trip unit is configured to provide a trip signal to said coil energizing module in response to a phase loss condition in said electrical system.

8. The combination starter of claim 1 wherein said case is a molded plastic case.

9. The combination starter of claim 1 wherein said motor comprises an inductive motor.

10. The combination starter of claim 1 wherein said combined electronic trip unit and contactor switch circuit is connected so as to receive operating power continuously when power to said motor is interrupted.

11. The combination starter of claim 1 wherein said combined electronic trip unit and contactor switch circuit compensates for thermal memory of said motor.

12. A combination starter for protecting a motor from overload current and short circuit current conditions in an electrical system, the combination starter comprising:
- detecting means for detecting an overload current in said electrical system and outputting a trip signal in response to said detecting an overload current;
- separating means for separating a pair of contacts in response to said trip signal;
- means for optically transmitting said trip signal between said detecting means and said separating means; and
- a fuse electrically coupled to said contactor and configured for withstanding motor inrush current during motor start-up while interrupting said electrical system when said motor is operational and a short circuit current occurs within said electrical system.

13. The combination starter of claim 12, wherein said detecting means and said separating means are magnetically coupled by an isolation transformer.

14. A combined electronic trip unit and contactor switch circuit for a combination starter, the combined electronic trip unit and contactor switch circuit comprising:
- a current transformer,
- an electronic trip unit electrically coupled to said current transformer,
- a coil energizing module optically coupled to said electronic trip unit,
- a contactor coil electrically coupled to said coil energizing module,
- a contactor mechanically coupled to said contactor coil, and
- wherein said electronic trip unit is configured to provide a trip signal to said coil energizing module in response to an overload current condition in said electrical system.

15. The combined electronic trip unit and contactor switch circuit of claim 14 wherein said coil energizing module is selected from a group including: an oscillator, a current level comparator, an energizing signal generator, and a single shot generator.

16. The combined electronic trip unit and contactor switch circuit of claim 14, further including:
- a voltage protection and rectification module electrically coupled to said protected circuit;
- a power supply circuit electrically coupled to said electronic trip unit; and
- wherein said voltage protection and rectification module and said power supply circuit are interconnected by means of an isolation transformer.

17. A combination starter for a motor control comprising:
- a case;
- a removable cover disposed on the case;
- a current transformer and an electronic trip unit in signal communication therewith, a contactor contact and a contactor switch circuit in operable communication therewith, said electronic trip unit configured to provide a trip signal to said contactor switch circuit to open said contactor contact;
- one or more fuse compartments within the case;
- a fuse compartment cover overlying each of said one or more fuse compartments; and
- a window for each fuse compartment provided in the fuse compartment cover, the window providing visual fuse indication status of a fuse electrically coupled to said contactor contact and disposed within a respective fuse compartment.

18. The combination started of claim 17 further comprising a combined electronic trip unit and contactor switch circuit and one or more current transformers, the one or more fuse compartments positioned between the combined electronic trip unit and contactor switch circuit and the one or more current transformers.

19. The combination starter of claim 17 further comprising a plurality of circular apertures on load and line sides of the removable cover for providing electrical connection access to internal components within the case.

20. The combination starter of claim 17 further comprising a fuse within each fuse compartment.

* * * * *